Jan. 24, 1928.

M. R. HANNA 1,657,258

ELECTRIC PROTECTIVE DEVICE

Filed March 19, 1927

Inventor:
Max R. Hanna,
by
His Attorney.

Patented Jan. 24, 1928.

1,657,258

UNITED STATES PATENT OFFICE.

MAX R. HANNA, OF ERIE, PENNSYLVANIA, ASSIGNOR TO GENERAL ELECTRIC COMPANY, A CORPORATION OF NEW YORK.

ELECTRIC PROTECTIVE DEVICE.

Application filed March 19, 1927. Serial No. 176,824.

This invention relates to protective devices for electrical apparatus and the general object of the invention is to provide improved means for preventing the frame or other normally insulated part of the electrical apparatus from acquiring an excessive or dangerous potential in case the insulation should become defective.

More specifically the present invention is intended to prevent the frame, body or other normally insulated metal part of an electrically driven vehicle becoming charged in any manner to a potential sufficient to shock passengers boarding or leaving the vehicle. The invention is particularly advantageous for protecting trackless trolley busses provided with pneumatic tires and insulated thereby from the ground and having the electric power supplied to the driving motors by means of a pair of overhead trolleys and suitable current collecting devices carried on the trolley pole of the bus.

With the frame of such a trackless trolley bus insulated from the ground and with the power supplied from overhead trolleys, a breakdown in the insulation of any part of the electrical equipment of the bus may result in impressing a potential on the frame or other metal parts of the bus sufficiently high to be dangerous or even fatal to passengers boarding or leaving the bus. The protective device of the present invention functions at all times to maintain the trolley bus frame substantially at ground potential and thereby effectively eliminates all possibility of passengers receiving an electric shock.

Briefly, in carrying the present invention into effect in a trackless trolley bus of the above type one of the pair of overhead trolleys is permanently grounded at suitable points throughout its length. A plurality of one way discharge devices such as electrolytic cells or the like are provided on the bus and interconnected between the metal frame and other conducting parts of the bus and the current collecting device in such a manner that the frame always assumes substantially the potential of the grounded trolley wire. Thus, irrespective of any interchange of the current collecting devices on the trolley pole between the two trolleys, the bus frame is always substantially at ground potential.

Figure 1:
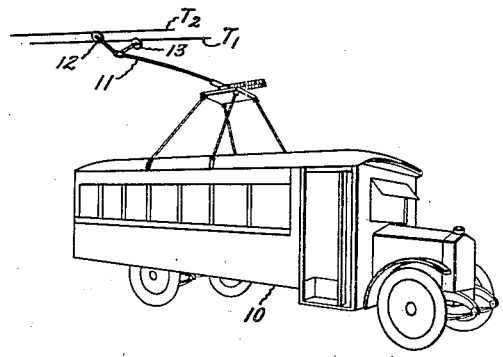
Figure 2:
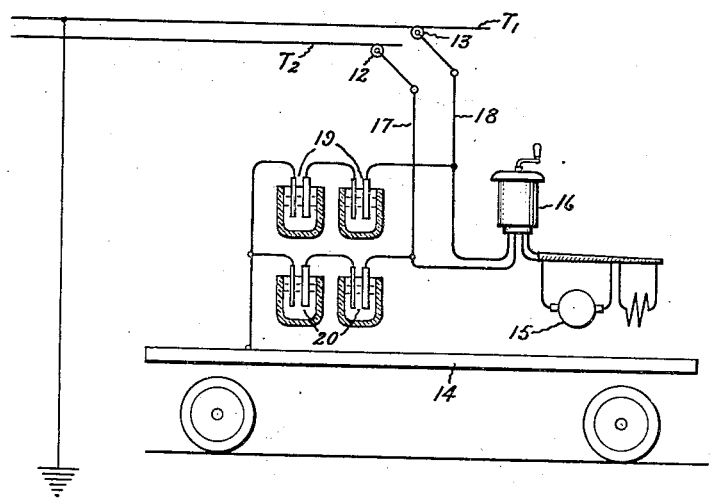

In the accompanying drawing, Fig. 1 illustrates a double trolley trackless bus adapted to be protected by the protective device of the present invention utilizing electrolytic cell discharge devices, and Fig. 2 is a schematic circuit diagram illustrating the manner in which the discharge devices are connected between the frame and the current collecting devices of the trackless trolley bus of Fig. 1.

It will be noted that the trolley bus 10 of Fig. 1 is of the usual type provided with pneumatic tires and thereby effectively insulated from the ground. Power is supplied to the driving motors of the bus from the two overhead trolley wires $T^1$—$T^2$ through the agency of the trolley pole 11, having the two under-running contact wheels 12 and 13 spaced to cooperate with the trolley wires $T^1$—$T^2$. The trolley pole 11 is pivotally mounted in the usual way to permit unrestrained operation of the bus 10 throughout substantially the whole width of the streets provided with the two overhead trolley wires $T^1$—$T^2$.

In the schematic diagram of Fig. 2, 14 represents the frame and other normally insulated metallic parts of the trolley bus 10. The starting and stopping of the trolley bus driving motor 15, as well as the speed regulation thereof, are controlled by suitable manually operated controller 16. Suitable conductors 17 and 18 are provided for transmitting the driving current supplied to the motor 15 from the trolley wire $T^1$—$T^2$ through the trolley wheels 12 and 13. Where the bus is run in both directions along the street, the engagement of the trolley wheels 12 and 13 with the trolley wire $T^1$—$T^2$ necessarily is interchanged for operation in opposite directions. Thus, for operation in one direction the trolley wheels 12 and 13 engage respectively with the trolley wires $T^1$—$T^2$, while for operation in the other direction the trolley wheel 13 engages with the trolley wire $T^1$ and the trolley wheel 12 engages with the trolley wire $T^2$.

Under such operating conditions a breakdown in the insulation of either of the power conductors 17 and 18 or in the insulation of any other part of the electrical equipment may result in impressing the potential of either one of the trolley wires $T^1$—$T^2$ upon the frame or other metallic parts of the bus 14. Consequently when a passenger is boarding or leaving the bus and establishes contact between the frame 14 and ground, a serious or even fatal electrical shock may result if there is any appreciable difference in potential between the frame and ground.

To prevent the possibility of such shocks in accordance with the present invention, a plurality of one way discharge devices such as the electrolytic cells 19 and 20 are provided and interconnected in series circuit between the power conductors 17 and 18 with the one way discharge devices arranged reversely in the circuit. The mid point in the series circuit between the discharge devices is connected to the frame 14 of the trolley bus. The electrolytic cells 19 and 20 shown in the drawing may be formed of any suitable combination of metals immersed in a suitable electrolyte, such for example as aluminum and tantalum for the anodes, and tin, lead or other metal for the cathodes, and dilute sulphuric acid for the electrolyte. The particular metals and electrolyte employed in the electrolytic cell is not of the essence of the present invention and any desired form of electrolytic cell or other type of one way discharge device such as vacuum tubes or the like, may be employed.

With the electrolytic cells reversely connected between the two power conductors 17 and 18 and the frame 14, as illustrated in Fig. 2, the one way discharge action of one of the electrolytic cells insures that the frame 14 always is substantially at the potential of one of the conductors 17 and 18 depending upon the polarity of the conductors. Thus with the trolley wire T¹ grounded at suitable points throughout its length and the electrolytic cells 19 and 20 arranged for reverse discharge action, the frame 14 is always maintained at substantially ground potential irrespective of whether the trolley wheel 12 or 13 is connected to the trolley T¹. With the trolley wheel 12 connected to the grounded trolley wire T¹, as illustrated, the electrolytic cells 20 function to maintain the frame 14 at substantially the same potential as the trolley wire T¹. If, on the other hand, the trolley wheel 13 is connected to the grounded trolley wire T¹, the electrolytic cells 19 function in a similar manner.

From the foregoing it will be seen that the present invention provides a relatively simple and inexpensive protective device which automatically functions to maintain the trolley bus frame at the potential of the grounded trolley wire. Moreover, the protection afforded by the electrolytic cells is much more reliable than where grounding relays or other forms of movable switch mechanism is employed.

What I claim as new and desire to secure by Letters Patent of the United States, is:—

1. The combination with electrical apparatus having a conducting frame and a plurality of electric conductors of differing potentials, of means including a plurality of one way discharge devices connected between the said conductors and the frame for maintaining the potential of the frame in a predetermined relation with the potentials of said conductors.

2. The combination with electrical apparatus having a conducting frame and a pair of electrical conductors, each of which may separately have a predetermined potential impressed thereupon, of means including a plurality of one way discharge devices connected between the said conductors and the frame for maintaining the frame substantially at said predetermined potential.

3. The combination with electrical apparatus having a conducting frame, and a pair of electric conductors, each of which may separately have a predetermined potential impressed thereupon, of a pair of one way discharge devices reversely connected in a circuit between said conductors and connected at the point in the circuit between the devices and the frame for maintaining the frame substantially at said predetermined potential.

4. The combination with electrical apparatus having a conducting frame normally insulated from ground and a pair of electrical conductors each of which may separately have ground potential impressed thereupon, of means including a plurality of one way discharge devices connected between the said conductors and the frame for maintaining the frame substantially at ground potential.

5. The combination with electrical apparatus having a conducting frame normally insulated from ground and a pair of electrical conductors, each of which may separately have ground potential impressed thereupon, of a pair of one way discharge devices reversely connected in a circuit between said conductors, and connected to the frame at the point in the circuit between the devices for maintaining the frame substantially at ground potential.

6. The combination with an electrically driven vehicle having the body normally insulated from ground and from the electric motive power equipment, of a pair of current collecting devices for the vehicle, each of which may separately have ground potential impressed thereupon, and means including a plurality of one way discharge devices connected between said current collecting devices and the vehicle body for maintaining the body substantially at ground potential.

7. The combination with an electrically driven vehicle, the body normally insulated from ground and from the electric motive power equipment, of a pair of current collecting devices for the vehicle, each of which may separately have ground potential impressed thereupon, and a pair of electrolytic cells reversely connected in a circuit between said current collecting devices and connected at the point in the circuit between the cells to the vehicle body for maintaining the body substantially at ground potential.

In witness whereof, I have hereunto set my hand this 17th day of March, 1927.

MAX R. HANNA.